INVENTOR.
RAYMOND H. LISKA.
BY William Isler.
Attorney

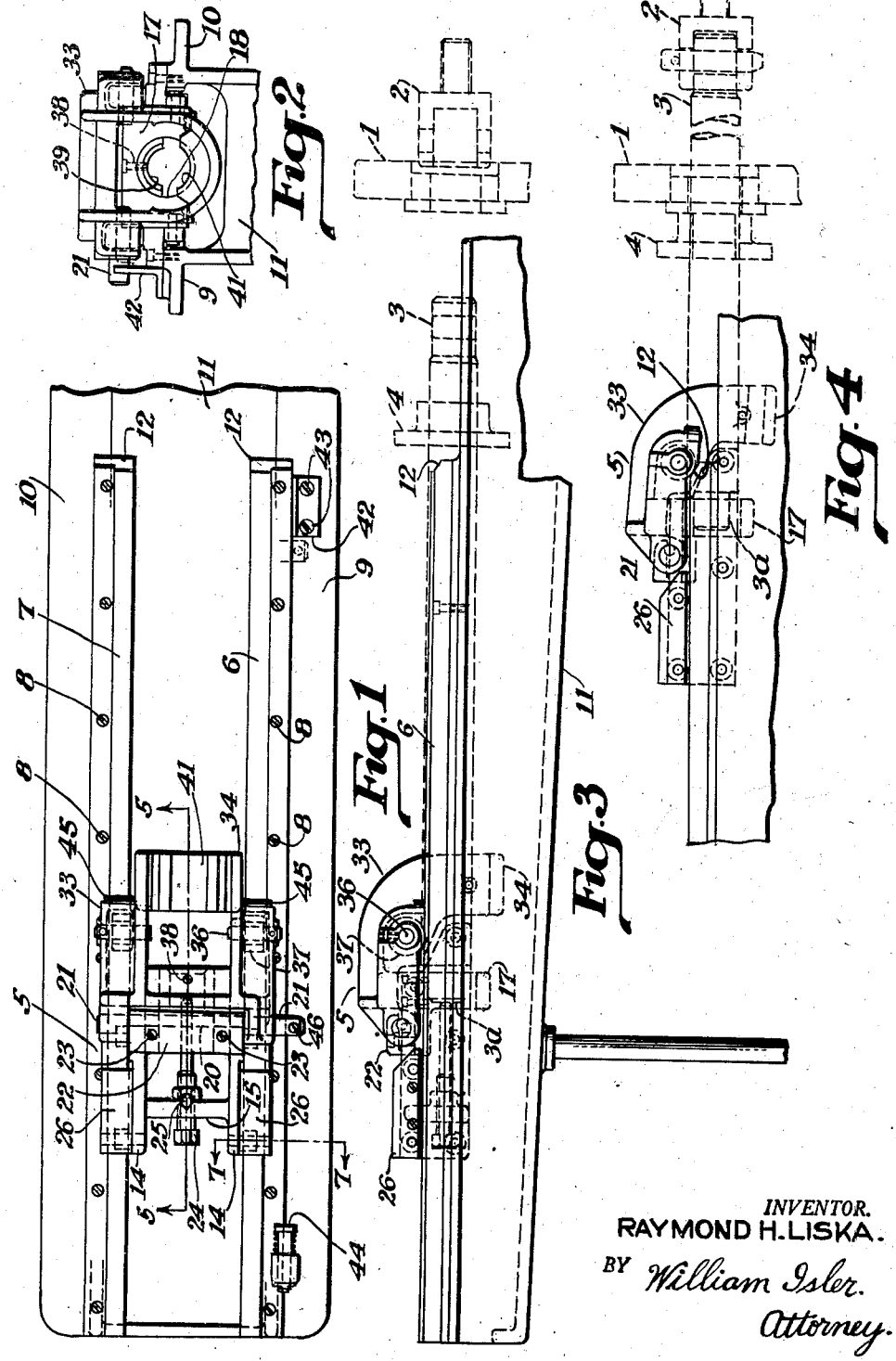

Patented June 10, 1947

2,421,793

UNITED STATES PATENT OFFICE 2,421,793

BROACH CARRIAGE

Raymond H. Liska, Cleveland, Ohio, assignor to The Cleveland Universal Jig Company, Cleveland, Ohio, a corporation of Ohio Application December 11, 1944, Serial No. 567,621

8 Claims. (Cl. 90—33)

This invention relates, as indicated to a broach carriage.

A primary object of the invention is to provide a broach carriage which will give effective support to a broach during the major portion of the broaching operation.

Another object of the invention is to provide a broach carriage in which release of the broach carrying function is automatically effected at a predetermined point in the movement of the carriage.

Another object of the invention is to provide a broach carriage in which the broach supporting function is automatically effected as a preliminary step to the broaching operation.

A further object of the invention is to provide a broach carriage which is adapted for the support and carriage of broaches of various sizes and diameters.

A still further object of the invention is to provide a broach carriage consisting of a minimum number of easily manufactured and readily assembled parts, which is inexpensive to manufacture, and which is of rugged, durable, construction.

Other objects and advantages of the invention will be apparent during the course of the following description.

In the accompanying drawings, forming a part of this specification, and in which like numerals are employed to designate like parts throughout the same.

Fig. 1 is a fragmentary top plan view of a broach carriage embodying the invention;

Fig. 2 is an end elevational view of the broach carriage, as viewed from the right of Fig. 1;

Fig. 3 is a side elevational view of the broach carriage, with the broach saddle in broach-supporting position;

Fig. 4 is a side elevational view of the broach carriage, with the broach saddle in its lowered or broach-releasing position;

Figure 5:
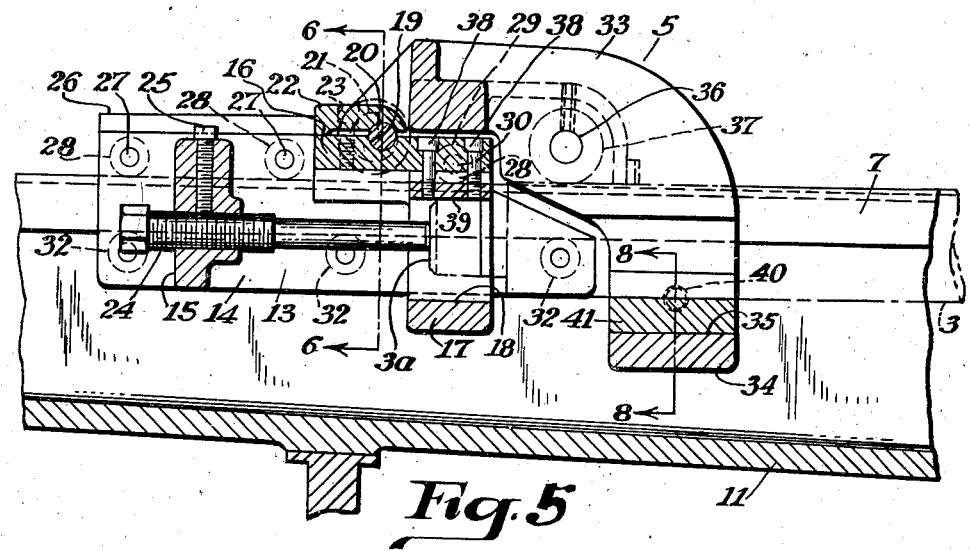
Fig. 5 is a cross-sectional view, taken on the line 5—5 of Fig. 1.
Figure 6:
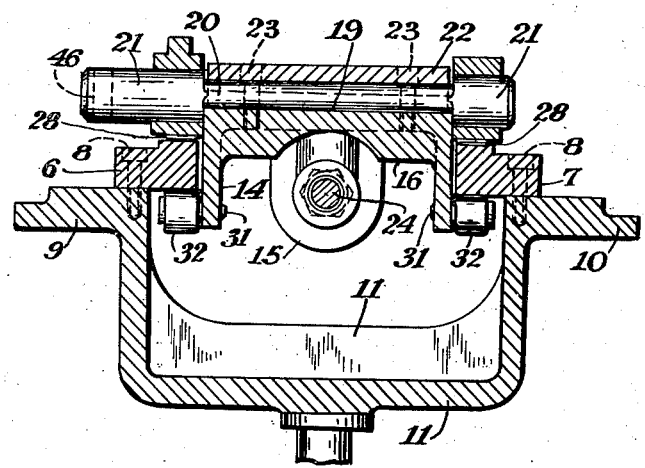
Fig. 6 is a cross-sectional view, taken on the line 6—6 of Fig. 5.
Figure 7:
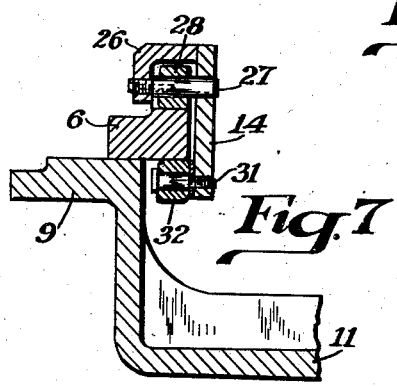
Fig. 7 is a fragmentary cross-sectional view, taken on the line 7—7 of Fig. 1.
Figure 8:
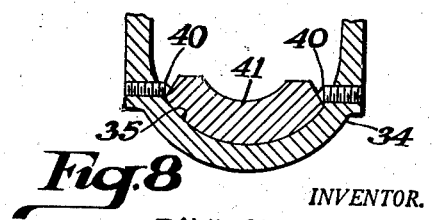
Fig. 8 is a fragmentary cross-sectional view, taken on the line 8—8 of Fig. 5.

Referring more particularly to the drawings, 1 represents a broaching machine head, 2 a broach puller, 3 a broach adapted to be engaged by the puller 2, for the purpose of being pulled through the work which is to be broached, and which is diagrammatically represented by the part 4. The broach 3 is provided with the conventional tail 3a, of reduced diameter.

The broach carriage which is the subject of the present invention, and which is represented, as a whole, by reference numeral 5, is adapted to be mounted for longitudinal movement on a pair of spaced rails 6 and 7, which are secured, as by screws 8 to the laterally spaced portions 9 and 10 of a base or support 11, which may form a part of the broaching machine. The rails 6 and 7 are chamfered or beveled at their forward ends to provide inclined or sloping surfaces 12 which serve a purpose to be presently described.

The broach carriage 5 comprises a carriage support or base 13 in the form of a casting having spaced walls 14 which are disposed between the rails 6 and 7 and have portions extending above and below the level of such rails. The walls 14 are interconnected by means of a vertically-disposed web 15, a horizontally-disposed web 16, and a vertically-disposed web 17, the latter having a circular bore or opening 18, the axis of which is substantially in alignment with the axis of the opening in the broaching machine head 1, through which the broach 3 is pulled.

The web 16 has a recess 19 in its upper surface for the reception of a shaft or pin 20 having ends 21 which are eccentric to the shaft and project beyond the ends of the recess 19. The shaft 20 is clamped to the web 16 by means of a clamp member 22, which is removably secured to the web 16, as by means of screws 23. An adjusting screw 24, the purpose of which will be presently described, extends through the web 15, in axial alignment with the axis of the opening 18, and a set screw 25 extends vertically through the web 15 for the purpose of maintaining the screw 24 in adjusted position.

The carriage base 13 is further provided with skirt portions 26 which overhang the rails 6 and 7, and mounted on these skirt portions of the base and in the walls 14 are shafts 27, upon which are journalled rollers 28 which are adapted for rolling movement on the upper surfaces of the rails 6 and 7. Similar rollers 29 are journalled on stub shafts 30 which extend through the walls 14 and are in threaded engagement with the web 17 of the carriage base. The rollers 29 are also adapted for rolling movement on the upper surfaces of the rails 6 and 7.

The carriage base 13 is also provided with stub shafts 31 upon which are journalled rollers 32, which are in rolling contact with the lower surfaces of the rails 6 and 7, the carriage base being in this manner, maintained against displacement from the rails in a vertical direction.

Pivotally secured to the eccentric end portions 21 of the shaft 20 is a saddle member 33, having a saddle portion 34 which extends downwardly into the space between the portions 9 and 10 of the base 11, such portion being also disposed in advance of the carriage base 13. The saddle portion 34 has a central opening or bore 35, the center of which, in the normal position of the saddle member, is in axial alignment with the axis of the bore 18 in the carriage base.

The saddle member is provided with shafts 36, upon which are journalled rollers 37 which bear against the upper surfaces of the rails 6 and 7 and support the saddle member for rolling movement along said rails.

Removably secured within the upper portion of the bore 18, as by means of screws 38, is a semi-circular insert 39, the interior diameter of which is substantially the same as the diameter of the tail 3a of the broach. Similarly secured within the bottom of the saddle portion 34 of the saddle member 33, as by means of set screws 40, is an arcuate insert 41, the radius of which is substantially the same as the radius of that portion of the broach 3 which is adjacent the tail 3a thereof. It is to be understood that for broaches of sizes other than that illustrated, inserts of corresponding dimensions will be employed.

A stop member 42 is also provided, being secured adjacent the forward end of the rail 6, as by screws 43. A spring-backed bumper 44 is also provided adjacent the rear end of the rail 6.

Wiper elements 45 of felt or like material are attached to the saddle member 33 and serve to wipe metal chips, oil and the like from the upper surfaces of the rails 6 and 7 incidental to the reciprocatory movement of the broach carriage.

Having thus described the constructional features of the broach carriage, the use and opreation thereof will now be briefly described.

With the broach carriage in the position shown in Figs. 1 and 3, it will be noted that the tail 3a of the broach is in contact with the forward end of the screw 24, that the insert 39 snugly engages the tail 3a and that the insert 41 snugly engages the portion of the broach which is adjacent the tail 3a, such portion of the broach being that end of the broach which has the maximum diameter. The broach is, in this manner, supported in axial alignment with the opening in the broaching machine head 1.

The part 4 which is to be broached is mounted on the broach in the position indicated in Fig. 3, and the broach carriage and broach manually advanced toward the machine head to a point at which the end of the broach may be engaged by the broach puller 2, the part 4 at this point being disposed adjacent the broaching machine head, where it may be clamped in a stationary position in any conventional manner.

The broach puller 2 is then set in operation and pulls the broach and carriage to the right, as viewed in Fig. 3, until the rollers 37 reach the inclined surfaces 12 of the rails 6 and 7, as shown in Fig. 4. As the rollers start down such inclined surfaces, the saddle member 33 drops out of contact with the broach, thereby releasing the broach, and permitting it to continue its movement. The broach carriage is brought to a stop by engagement of one of the shaft ends 21 with the stop member 42.

At the conclusion of the broaching operation, the broach is moved to the left as viewed in Fig. 4, and the tail 3a brought into engagement with the screw 24. The broach then pushes the carriage to the left, causing the rollers 37 to ride up the inclined surfaces 12, thereby lifting the saddle member 33 to its normal position and bringing the insert 41 thereof into engagement with the broach. The carriage and broach are then returned to their original position, for resumption of the broaching operations. The bumper 44 is engaged by one of the ends 21 of the pin 20 to stop the rearward movement of the carriage in a resilient manner.

The screw 24 may be adjusted to any desired position, depending on the length of the broach and other factors.

In order to insure alignment of the saddle member 33 with the broach, the position of the saddle member relatively to the carriage base may be adjusted. This is accomplished by loosening the clamp 22, and turning the pin 20 sufficiently to vary the position of the eccentric ends 21 thereof relatively to the saddle member, after which the clamp 22 is again tightened on the pin 20. For the purpose of permitting turning of the pin 20, an opening 46 is provided in one end of the pin for the reception of a tool or instrument for turning the pin.

The broach carriage, in addiiton to accomplishing the various objects, as hereinabove set forth, provides the following advantages:

(a) It insures a longer life for the broach, since a true alignment of the broach, broach puller and carriage is provided at all times, and sagging of one end of the broach is avoided.

(b) The carriage insures ease of operation of the broach.

(c) The speed of production of the work is increased.

(d) Safety for the operator is afforded because it is not necessary to handle the broach.

(e) The speed of production of the work is increased because the work need not be clamped during the broaching operation.

(f) The cost incidental to the use of work adaptors is lessened, because of the elimination of work holding clamps.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

I claim:

1. In combination, a pair of spaced rails, each having a corresponding straight and inclined surface, a broach carriage movable along said rail surface, said carriage comprising a base and a saddle member provided for travel along said rail surface, said base having a portion thereof adapted for engaging the upper surface of the broach at the tail thereof, and said saddle member having a portion adapted for engaging the lower face of said broach at a point spaced from the point of engagement between the base and broach, means pivotally connecting the saddle member and the base so as to permit movement of the saddle member toward and away from broach engaging position, surfaces on said saddle member in spaced relation to said pivotal mounting for travel along said straight rail surfaces for holding said saddle member in broach clamping position and for travel on said inclined rail surfaces for releasing said broach, and means for moving the broach carriage along said rails, whereby the saddle member is moved into or out of engagement with the broach when the surfaces on the saddle member engage the straight or inclined surfaces of the rails.

2. A combination as defined in claim 1, in which said means pivotally connecting the saddle member and the base comprise a pin passing through said saddle member and having its ends journaled in said base, said ends being eccentric to the axis of the pin.

3. A combination as defined in claim 1, in which rollers are provided on said base and said saddle member for travel on said rails.

4. A combination as defined in claim 3, in which said rollers on said base are in spaced relationship to opposing surfaces on each of said rails.

5. In combination, a pair of spaced rails, each having a corresponding straight and inclined surface, a broach carriage movable along said rails, said carriage comprising a base and a saddle member each provided with rollers for travel along said rails, said base having an opening therein adapted for circumferentially engaging a portion of the broach at the tail thereof, and said saddle member having an opening therein adapted for circumferentially engaging the broach in a direction opposed to and spaced from said first-named engagement, means pivotally connecting the saddle member to the base so as to permit movement of the saddle member relatively to the broach, and surfaces on said saddle member in spaced relation to said pivotal mounting for holding said saddle member in broach clamping position when said surfaces are in engagement with the straight rail surfaces and for releasing said saddle member from the broach clamping position when said surfaces are in engagement with the inclined rail surfaces.

6. A combination as defined in claim 5, in which said base is provided with an adjusting screw engaging the end of the broach to provide an adjustable stop therefor.

7. A combination as defined in claim 5, in which said pivotal mounting means are adjustable to vary the position of said saddle member surfaces relatively to said pivotal mounting.

8. A combination as defined in claim 5, in which said rails are provided with members adapted to intercept and limit the movement of said base on said rails.

RAYMOND H. LISKA.

REFERENCES CITED

The following references are of record in the file of this patent:

UNITED STATES PATENTS

| Number | Name | Date |
| --- | --- | --- |
| 1,137,218 | Lapointe | Apr. 27, 1915 |
| 1,266,496 | Lapointe | May 14, 1918 |
| 1,406,022 | Infiorati, Jr. | Feb. 7, 1922 |
| 1,421,014 | Lapointe | June 27, 1922 |
| 1,837,933 | West | Dec. 22, 1931 |
| 2,106,213 | Halborg | Jan. 25, 1938 |
| 2,158,720 | Hart | May 16, 1939 |